United States Patent [19]

Cherukuri

[11] Patent Number: 5,236,720
[45] Date of Patent: Aug. 17, 1993

[54] REDUCED CALORIE SUCRALOSE SWEETENED CHEWING GUM

[75] Inventor: Subraman R. Cherukuri, Towaco, N.J.

[73] Assignee: Warner-Lambert Company, Morris Plains, N.J.

[21] Appl. No.: 630,106

[22] Filed: Dec. 19, 1990

Related U.S. Application Data

[63] Continuation-in-part of Ser. No. 427,663, Oct. 27, 1989, Pat. No. 5,059,429.

[51] Int. Cl.$^5$ ............................................. A23G 3/30
[52] U.S. Cl. ...................................... 426/3; 426/548; 426/804
[58] Field of Search ................ 426/36, 548, 658, 804

[56] References Cited

U.S. PATENT DOCUMENTS

| | | | |
|---|---|---|---|
| 4,150,161 | 4/1979 | Rudolph et al. | 426/3 |
| 4,252,380 | 2/1981 | Kehoe et al. | 426/3 |
| 4,357,354 | 11/1982 | Kehoe et al. | 426/3 |
| 4,435,440 | 3/1984 | Hough et al. | 426/3 |
| 4,514,422 | 4/1985 | Yang | 426/3 |

FOREIGN PATENT DOCUMENTS

| | | | |
|---|---|---|---|
| 0082670 | 6/1983 | European Pat. Off. | 426/3 |
| 8808672 | 11/1988 | European Pat. Off. | 426/3 |

*Primary Examiner*—Jeanette Hunter
*Attorney, Agent, or Firm*—M. Andrea Ryan; Jean B. Barish

[57] ABSTRACT

A reduced calorie sucralose sweetened chewing gum composition having a moisture content below about 2% by weight, wherein the sucralose is released from the composition so as to provide a high up-front sweetness intensity during the first 2 minutes of chewing.

28 Claims, 3 Drawing Sheets

REDUCED CALORIE SUCRALOSE SWEETENED CHEWING GUM

RELATED APPLICATION INFORMATION

This application is a continuation-in-part of U.S. Ser. No. 07/427,663, filed Oct. 27, 1989, now U.S. Pat. No. 5,059,429, the entire disclosure of which is incorporated herein by reference.

BACKGROUND OF THE INVENTION

1. Field of the Invention

The present invention relates to a novel chewing gum composition and in particular to a reduced calorie sucralose sweetened chewing gum composition having a moisture content below about 2% by weight of the final composition wherein said composition contains a major amount of chewing gum base, at least a minor amount of one bulking agent and about 3% to about 15% hygroscopic liquid by weight of the final chewing gum composition. The present invention also relates to a process for preparing the reduced calorie chewing gum composition of the present invention.

2. Description of Related Art

Chewing gums and bubble gums have been prepared in the past with the purpose in mind of extending shelf life, increasing initial flavor and sweetener intensity and prolonging long lasting sweetness and flavor without bitterness being developed. With regard to shelf stability, gums prepared and stored, even at room temperature, for extended periods of time tend to lose their moisture and elasticity, with the result that they become brittle, and initially crumble when they are placed in the mouth. This problem is particularly noticeable in the instance of sugarless gums, and particularly those gums that are stored in a dry atmosphere, for example atmospheres having less than about 50 to 60% relative humidity.

Sugarless gums conventionally contain on the order of at least about 5% by weight of water; and it is therefore theorized that brittleness or the phenomenon of staling results from the loss of that water, due to evaporation or otherwise over time. Specifically, sugarless gums contain large amounts of sorbitol which serves conventionally as a sweetener as well as a bulking aid. Sorbitol is known for its tendency to recrystallize in the presence of even small amounts of water and its tendency to crystallize when the water in which it is dissolved is removed. It is therefore theorized that as the water containing the sorbitol in the gum composition is lost by evaporation or otherwise, the sorbitol crystallizes and thus promotes the embrittlement of the gum composition that contributes to the staling phenomenon.

In addition, the prior art has disclosed chewing gum compositions which have low percentages of moisture in the final product. For the most part, the prior art has concentrated on driving off the water once the chewing gum formulation has been made. Thus the prior art compositions ordinarily contain water and/or moisture containing ingredients, e.g., sorbitol solutions, corn syrups solutions and so forth, and would therefore require heating or purification of the composition to drive off water and obtain a certain moisture content.

In this regard, U.S. Pat. No. 4,035,572 discloses a gum base formulation with less than about 0.5% moisture. This low percentage of moisture is due to the purification process which removes water and solvent from the gum base.

U.S. Pat. No. 3,262,784 concerns a chewing gum composition which has less than 1% moisture in the final product, due to heating between about 170° and 250° F. to drive off the water.

U.S. Pat. No. 4,150,161 concerns a two-component confectionery formulation having a carbonated candy component and a pliable bubble gum component, with each component having a controlled water activity between 0.1 and 0.3 and which is capable of surviving long periods of storage when packaged in a moisture-resistant material.

U.S. Pat. No. 4,514,422 to YANG et al. discloses a substantially anhydrous chewing gum composition which is useful in the chewing gum formulations of this invention. These formulations contain a gum base, sugar alcohol and glycerin in amounts greater than 10% to about 18%, with disclosed amounts above 8% being usable. The disclosure of this reference is incorporated herein by reference.

The prior art chewing gum formulations have been used in combination with both natural and artificial sweeteners. Intense artificial sweeteners that have been disclosed for use in chewing gum formulations include the water-soluble artificial sweeteners, such as soluble saccharin salts such as sodium or calcium saccharin, cyclamate salts, acesulfame-K and the like and the free acid form of saccharin. In addition, dipeptide based sweeteners such as L-aspartyl-L-phenylalanine methyl ester and materials described in U.S. Pat. No. 3,492,131 and the like have also been described.

In addition to these artificial sweeteners, another artificial sweetener, namely sucralose, has been recently described in U.S. Pat. No. 4,380,476, along with its use in ingestible products as described in U.S. Pat. Nos. 4,549,013 and 4,435,440. Sucralose is reported to be 600 to 650 times as sweet as sucrose and has the chemical name 4-1'-6'-trichlorogalactosucrose, and has been abbreviated as a chloroderivative of sucrose. This particular sweetener is a high intensity artificial sweetener, since it is many times more sweet than sucrose itself, similar to saccharin which is about 300 times as sweet as sucrose, aspartame which is about 200 times as sweet as sucrose, and acesulfame-K which is about 200 times as sweet as sucrose.

Several limitations have existed in chewing gum formulations which relate to the rate at which the sweetener is released from the chewing gum composition when it is being chewed. Such release normally occurs in both sugar and nonsugar sweetened chewing gum formulations within times of from 5 to 7 minutes upon commencement of chewing. In view of this rate of release of sweetener from the chewing gum within the first several minutes of chewing, chewing gum manufacturers have attempted to not only increase the intensity of the sweetener which is delivered initially upon chewing of the gum, but also to delay the sweetness release over a longer period of time and in particular for times of up to about 25 to 30 minutes.

The ability to achieve high intensity up-front sweetness has been achieved by using artificial intense sweeteners, such as saccharin salts, acesulfame-K and free aspartame in chewing gum formulations in amounts of about 0.05 to about 0.2% by weight of the formulation. One problem relating to the use of saccharin salts and acesulfame-K is the bitterness/off-note taste associated with such products, whereas aspartame degrades in its free form in the presence of moisture in conventional chewing gums. Even at low levels of about 2 or more percent moisture, aspartame will be degraded upon storage thus rendering it unavailable when the chewing gum is to be utilized.

With regard to delayed release or longer lasting release in chewing gum formulations, various techniques have been employed in the art, such as encapsulation of the sweetener components and use of sweetener-enhancing compounds, such as thaumatin and monellin. PCT application WO88/08672 also discloses a chewing gum composition having a controlled long lasting sweetness release comprising a gum base and an effective amount of the sweetener sucralose. The chewing gum contains sucralose in an amount such that within the initial two minutes of chewing the sucralose releases from the gum at a rate less than about 8 sucrose equivalents per minute; and at about 10 minutes of chewing, the sucralose releases from said gum at a rate of about 3 sucrose equivalents per minute. The chewing gum, in addition, may also contain a fast release sweetener, or an additional amount of sucrose treated to act as a fast release sweetener. More particularly, the technology described in this publication relates to an initial slow release of sucralose from the chewing gum formulation with a continued sustained or delayed longer lasting sweetness release throughout chewing. The reference, however, is silent as to how delayed release is achieved.

Reduced calorie, low calorie, and no calorie chewing gum compositions are well known. To reduce calories in chewing gum it is necessary to replace the soluble sugar and sugar alcohol bulking agents present in conventional chewing gums with low calorie alternatives. Prior attempts to produce a reduced calorie chewing gum composition have relied on high levels of inert fillers or texturizing agents to replace the sugars and sugar alcohols used as both bulking and sweetening agents in conventional chewing gums.

For example, U.S. Pat. No. 4,382,963, discloses a sugar-free, low calorie chewing gum utilizing polydextrose as the sole soluble bulking agent. From 65% to 85% by weight polydextrose is incorporated into the gum base to form a sugar-free, unsweetened, chewing gum with a caloric density of less than one calorie per gram.

U.S. Pat. Nos. 4,252,830 and 4,357,354 disclose a substantially calorie-free chewable chewing gum base which includes gum base containing high levels of inert fillers, such as calcium carbonate or talc in amounts of at least about 40% by weight. The chewable gum base includes at least 10% air voids entrapped in the gum base matrix which, upon chewing, becomes filled with moisture causing a dramatic increase in bolus volume.

U.S. Pat. No. 4,241,091 disclose a substantially calorie-free, non-cariogenic, non-adhesive chewing gum consisting essentially of gum base, a substantially calorie-free sweetener, from 1 to 15% by weight of alpha-cellulose, and from 1 to about 40% by weight water.

U.S. Pat. No. 4,765,991 provides a highly palatable low calorie chewing gum composition with enhanced mouth-feel and improved chew that includes from about 5% to about 10% polysaccharide, a high amount of non-SBR/PVA gum base and a sweetener.

It remains desirable, however, to prepare a reduced calorie chewing gum formulation which does not possess the instability problems associated with the use of aspartame, or bitterness/off-note taste associated with saccharin salts and acesulfame-K, yet one which is capable of rapidly releasing the sweetener upon initial chewing of the formulation, and is optionally capable of extended sweetener release. This initial onset of sweetness should be performed in the absence of a concurrent bitterness associated with high intensity sweeteners. Such formulations may also employ sweetening components which are able to achieve a longer lasting sweetness in combination with this initial high intensity sweetness.

SUMMARY OF THE INVENTION

In accordance with the present invention, a reduced calorie chewing gum composition has been prepared which has an immediate high release of sucralose during the first 2 minutes of chewing, followed by sustained release of the artificial sweetener at a reduced yet consistent level at about 5 minutes of chewing. The chewing gum compositions used in the present invention include a major amount of gum base, at least a minor amount of one bulking agent, and hygroscopic liquid in an amount ranging from about 3% to about 15% by weight of the chewing gum composition. In addition, the reduced calorie chewing gum compositions of the invention are considered anhydrous or substantially anhydrous formulations which have moisture contents below about 2% by weight of the final chewing gum composition. Only by use of substantially moisture-free chewing gum formulations which employ hygroscopic liquid in the recited amounts are Applicants able to achieve a specific initial high sucralose release rate from the present formulations.

The present invention also includes a process for preparing the subject chewing gum formulations, wherein the sucralose component is added in the final chewing gum manufacturing step with a remaining portion of the bulking agent. By employing such a procedure, the sucralose apparently becomes easily removable from the chewing gum compositions within the first 2 minutes of chewing, thus resulting in a high release of sweetener during this initial phase. More particularly, the process for preparing the present reduced calorie sucralose-sweetened chewing gum composition comprises softening a major amount of gum base and adding thereto a portion of the total amount to be added of at least a minor amount of one bulking agent, while mixing the ingredients, adding to this mixture from about 3% to about 15% by weight hygroscopic liquid while mixing the formulation, followed by addition and mixing of a pre-blend containing the sucralose admixed with the remaining amount of the bulking agent; continuing mixing until a homogenous mixture is obtained; and recovering the final chewing gum composition.

The reduced calorie chewing gum compositions prepared according to the invention exhibit sufficient plasticity and softness and retain these qualities over time without the presence of additional amounts of water being added. Thus, the present compositions may be exposed to relatively low humidity conditions for extended periods of time that may range as long as one year. Flavor sensation, chewability and other properties of the gums, including film formation in the case of bubble gums, are not adversely affected by the practice of the present invention and result in the formation of chewing gum materials which have an initial high burst of sweetness coupled with long lasting sweetener release when the chewing gum formulations are chewed.

DESCRIPTION OF THE PREFERRED EMBODIMENTS

The present invention relates to a reduced calorie sucralose sweetened chewing gum composition having a moisture content below about 2% by weight of the final chewing gum composition which composition exhibits a high release of the intense sweetener within the first 2 minutes of chewing. The chewing gum composition contains three essential components in addition to sucralose, the components being a major amount of chewing gum base, at least a minor amount of one bulking agent and a hygroscopic liquid. The components are preferably employed in the composition such that the total moisture content of the final chewing gum composition is less than about 2% by weight and preferably less than about 1% by weight. Such formulations are considered to be substantially anhydrous formulations according to the invention and are essential in order to obtain an initial high release of the intense sweetener, sucralose, from these formulations.

The reduced calorie chewing gum can be prepared in sugar or sugarless chewing gum combinations which can be made into a variety of products, e.g. stick, slab, chunk, balls, ropes, tablets and/or center-filled gum products.

The present invention provides a chewing gum which is initially soft and chewable, has reduced calorie content and a desirable sweetness level. The chewing gum of the invention will have a calorie content of less than two-thirds and preferably less than 50% of that of conventional sugar containing and sugarless chewing gums with comparable sweetness.

As used in the specification and claims, the term "reduced calorie" shall mean having a calorie content two-thirds or less than that of conventional chewing gum, "light calorie" shall mean less than 50% of the calories of conventional chewing gum and the term "low calorie" shall mean having a calorie content of 0.4 calories or less per gram of chewing gum. Conventional carbohydrate containing chewing gums contain 3 to 4 calories per gram.

With regard to the chewing gum composition, the amount of gum base employed will vary greatly depending on various factors such as the intended calorie content of the final product, the type of base used, consistency desired and other components used to make the final product. In general, the chewing gum base is employed in major amounts, namely, amounts of about 50% to about 90% by weight of the final chewing gum composition in the reduced calorie chewing gum compositions, with preferred amounts being in the range of about 65% to about 80% by weight.

The gum base may be any water-insoluble gum base well known in the art. Illustrative examples of suitable polymers in gum bases include both natural and synthetic elastomers and rubbers which include, without limitation, substances of vegetable origin such as chicle, jelutong, gutta percha and crown gum, synthetic elastomers such as butadienestyrene copolymers, isobutylene-isoprene copolymers, polyethylene, polyisobutylene and polyvinylacetate and mixtures thereof.

A preferred gum base for use with the present invention comprises a non-styrene-butadiene copolymer/polyvinyl acetate (non-SBR/PVA) elastomer chewing gum base. The non-SBR/PVA gum base provides a hydrophilic chew character to the chewing gum which results in a pleasant moist chew.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mixtures thereof. Examples of elastomer solvents suitable for use herein include the pentaerythritol ester of partially hydrogenated wood rosin, pentaerythritol ester of wood rosin, glycerol ester of wood rosin, glycerol ester of partially dimerized rosin, glycerol ester of polymerized rosin, glycerol ester of tall oil rosin, glycerol ester of wood rosin and partially hydrogenated wood rosin and partially hydrogenated methyl ester of rosin, such as polymers of alpha-pinene or beta-pinene; terpene resins including polyterpene and mixtures thereof. The solvent may be employed in an amount ranging from about 10% to about 75% and preferably about 45% to about 70% by weight of the gum base.

A variety of traditional ingredients may be incorporated into the gum base such as plasticizers or softeners. Examples of these ingredients include lanolin, stearic acid, sodium stearate, potassium stearate, glycerol triacetate and the like. Natural waxes, petroleum waxes, polyurethane waxes, paraffin waxes and microcrystalline waxes may also be incorporated into the gum base to obtain a variety of desirable textures and consistency properties. Mixtures of these traditional ingredients are contemplated. These individual additional materials are generally employed in amounts of up to about 30% by weight and preferably in the amounts of from about 3% to about 20% by weight of the final gum base composition.

As mentioned earlier, the reduced calorie chewing gum formulations of this invention include at least one bulking agent. Any bulking agent or combination of bulking agents known in the art may be employed in accordance with the instant invention. For example, fillers such as calcium carbonate, celluloses, bran, talc, aluminum hydroxide, alumina, aluminum silicates, calcium phosphates (anhydrous and dihydrate) and combinations thereof may be utilized. Other useful bulking agents include polysaccharides selected from the group consisting of polydextrose, polymaltose, modified polydextrose and mixtures thereof. These polysaccharides are water-soluble, low calorie, non-cariogenic agents which contribute the bulk and texture normally obtained with sugar and sugar alcohols. A preferred polysaccharide is polydextrose, which is a water-soluble, randomly bonded polymer of glucose containing minor amounts of sorbitol end groups and bound citric acid. Polydextrose has an average molecular weight of about 1500, ranging from about 162 to about 20,000. It is a bland tasting material having about one calorie per gram.

Sugar and sugar alcohols are optional bulking agents that may be included in the reduced calorie chewing gum formulations of the invention. Useful sugar alcohols include sorbitol, xylitol, mannitol, maltitol, and the like. When employed, the sugar alcohols may comprise from about 0% to about 35% by weight of the total gum composition, and preferably from about 0% to about 15% by weight.

In general, the above-described bulking agents are used in a minor amount so as to provide a total chewing gum composition having 100% by weight. Preferably, the bulking agent is present in an amount of less than 50% by weight of the final composition.

Cellulose may be employed as a no-calorie filling and texturizing agent to further reduce the calorie content of the chewing gum. The cellulose used herein is water-insoluble and may be present in the invention in amounts up to about 7%, preferably 1% to 6%, and most preferably 3% to 6% by weight. Without being limited to particular celluloses, representative illustrations encompass: alpha cellulose, microcrystalline cellulose, powder cellulose which is composed of 90% beta-1, 4-glucan and 10% galactan hydroxypropyl methylcellulose, cellulose flour and the like. While not essential, the average particle size of the cellulose may range from about 3 microns to about 50 microns, preferably about 5 microns to about 30 microns and most preferably about 5 microns to about 20 microns.

In accordance with the present invention, water is all but entirely deleted from the present inventive compositions, and hygroscopic liquids are added in amounts ranging from about 3% to about 15% by weight of the total composition. Amounts above about 15% introduce a higher calorie content to the chewing gum compositions than is desirable in accordance with the present invention. Glycerin and 1,2 propanediol are the preferred hygroscopic liquids which are also preferably provided in anhydrous form. Anhydrous glycerin is available as a syrupy liquid with a sweet warm taste, that offers a sweetness of about 60% that of cane sugar. The hygroscopic liquids are present in preferred amounts ranging from about 4% to about 6% by weight, and contain water in an amount by weight that does not exceed about 1.5%.

In a preferred embodiment of the present invention, a reduced calorie chewing gum composition is prepared that comprises a major amount of gum base in an amount ranging from about 65% to about 80% by weight, flavor in an amount ranging from about 0.6% to about 1.5% by weight, glycerin or 1,2 propanediol in an amount ranging from about 4% to about 6% by weight, and the balance comprising a minor amount of bulking agent. The gum composition is a substantially anhydrous mixture of the above ingredients, and contains no more than 2% by weight water in any form.

Sucralose is employed in the invention as the primary artificial sweetener. The particle size of the sucralose is believed to play a role in providing a formulation which exhibits high up-front sweetness release. Preferably, 90% of the sucralose particles employed have a particle size of less than 37 microns and 50% of the sucralose particles are less than 10.7 microns in size, in order to achieve an acceptable sweetener release. Larger particles cause the sucralose to be retained in the formulation and form delayed, i.e., sustained, longer sweetener release products rather than products having high up-front sweetness.

The substantially anhydrous reduced calorie chewing gums of the invention when chewed result in the sucralose being released into the oral cavity so as to provide a high sweetness intensity within the initial 2 minutes of chewing, resulting in a rapid onset of sweetener perception. As chewing continues, the sucralose level drops gradually and results in a reduced, yet consistent sweetness intensity at 5 minutes of chewing. This level of sweetness release is achieved by employing from about 0.05% to about 0.5% by weight sucralose and preferably from about 0.1% to about 0.4% by weight sucralose.

The reduced calorie chewing gum compositions prepared according to this invention are perceived as having an excellent initial sweetness level while leaving the flavor components basically unaffected and contributing nothing to bitterness. With regard to this latter feature, other intense sweeteners affect the bitterness character of the gum product by exhibiting such property when used in high amounts.

While the invention is directed to the immediate release of a high intensity sweetener within the first 2 minutes of chewing, and subsequent slower release at reduced levels, the addition of optional sweeteners to prepare a longer lasting, greater intense sweetener release rate is also contemplated.

In the instances where auxiliary sweeteners are utilized in addition to sucralose, the present invention contemplates the inclusion of those sweeteners well known in the art, including both natural and artificial sweeteners. Thus, additional sweeteners may be chosen from the following non-limiting list: sugars such as sucrose, glucose (corn syrup), dextrose, invert sugar, fructose, and mixtures thereof, saccharin and its various salts such as the sodium or calcium salt; cyclamic acid and its various salts such as the sodium salt; the dipeptide sweeteners such as aspartame; dihydrochalcone compounds; glycyrrhizin; Stevia Rebaudiana (Stevioside); alitame; talin; and the like. Also contemplated as an additional sweetener is the nonfermentable sugar substitute (hydrogenated starch hydrolysate) which is described in U.S. Reissue Pat. No. 26,959. Also contemplated is the synthetic sweetener 3,6-dihydro-6-methyl-1-1,2,3-oxathiazin-4-one-2,2-dioxide particularly the potassium (Acesulfame-K), sodium and calcium salts thereof as described in German Patent No. 2,001,017.7. Other sweeteners and mixtures of sweeteners are contemplated.

When the additional optional sweeteners are used they may be employed in amounts necessary to impart long lasting sweetness and are preferably employed in amounts of about 0.001 to about 50% by weight. Aspartame, acesulfame-K, saccharin and its salts are the preferred tertiary sweeteners and are used in amounts of about 0.01% to about 2.5% and preferably about 0.05% to 1.0% respectively, by weight. The other auxiliary sweeteners may be used in conventional amounts based on the total weight of the chewing gum composition, as standard in the art.

One or more of the sweeteners may be in encapsulated form prior to incorporation in the chewing gum composition, thus delaying the release of the sweetener and lengthening the perceptible sweetness and/or staggering their release. Thus, the sweeteners may be incorporated such that they release sequentially.

In addition to the ingredients listed above, the gum compositions may also include a wide variety of adjuvant materials, such as plasticizers, softeners, fillers, thickeners, and, of course, various flavors.

Useful plasticizers or softeners include lanolin, propylene glycol, and the like, and mixtures thereof. These components are included optionally to achieve desired texture and consistency of the final gum composition.

Fillers such as calcium carbonate, magnesium carbonate, talc, and the like discussed above, as well as mineral adjuvants may be further included in the overall gum composition to provide body to the product.

The gum compositions may also contain thickeners, that may be employed along or in conjunction with other softeners. The thickeners may include methylcellulose, alginates, carrageenan, xanthan gum, gelatin, tragacanth, locust bean, and carboxymethylcellulose.

The gum compositions may contain a variety of flavors alone or in admixture with each other, depending upon the type of gum it is desired to prepare. Particularly, flavors useful in the present invention include essential oils, such as cinnamon, spearmint, peppermint, birch, anise and the like; natural fruit flavors derived from the essence of fruits, such as apple, pear, peach, strawberry, cherry, apricot, orange, watermelon, banana and the like; bean-derived flavors, such as coffee, cocoa and the like; wine-derived flavors, such as curacao, zin and the like; and pungent materials, such as affinin, pepper, mustard and the like. The flavor component is added in a range of from about 0.3% to about 2.5% by weight of the entire gum composition.

The present method includes a method for preparing a gum composition, including both chewing gum and bubble gum formulations, comprising preparing a pre-blend of a portion of the bulking agent with the sucralose in powdered form. Preferably, the pre-blend formulation contains about 10% by weight of the total bulking agent used in the chewing gum composition. As described in U.S. Pat. No. 4,514,422, the gum base, a sugar alcohol and glycerin may be optionally dried such that the anhydrous formulations of the invention may be prepared. This is not a critical embodiment and is an optional embodiment. An illustrative process involves first melting the gum base at a temperature from 70° to 120° C. and mixing the gum base in a kettle with a liquid softener and/or an emulsifier for 2 to 8 minutes. To this mixture, about 85% to about 95% of the bulking agent ingredient and color additives are added and mixing is continued for an additional 1 to 4 minutes. The hygroscopic liquid, such as glycerin or 1,2 propanediol, is then added to the formulation and mixed for an additional 1 to 5 minutes, followed by addition of the flavoring agent, wherein mixing is continued until a homogenous mixture is prepared. To this mixture is added the pre-blend containing the remaining bulking agent and sucralose. Mixing is maintained for 1 to 4 minutes. The gum is then discharged from the kettle and formed into its desired shape, such as strips, slabs, chunks, balls, ropes and/or center-filled. By adding the sucralose through the bulking agent in the final step of the process of the invention, the sucralose is able to be released immediately upon chewing the chewing gum formulations of the invention.

The following examples are given to illustrate the invention, but are not deemed to be limiting thereof. All percentages given throughout the specification are based on weight, unless otherwise indicated, percentages of base components are by weight of the base, whereas chewing gum composition components are by weight of the final chewing gum formulation.

EXAMPLE 1

Table I shows various reduced calorie chewing gum formulations of the instant invention using sucralose as the sweetener of choice, and a bulking agent selected from polydextrose, sugar and sorbitol.

Figure 1:
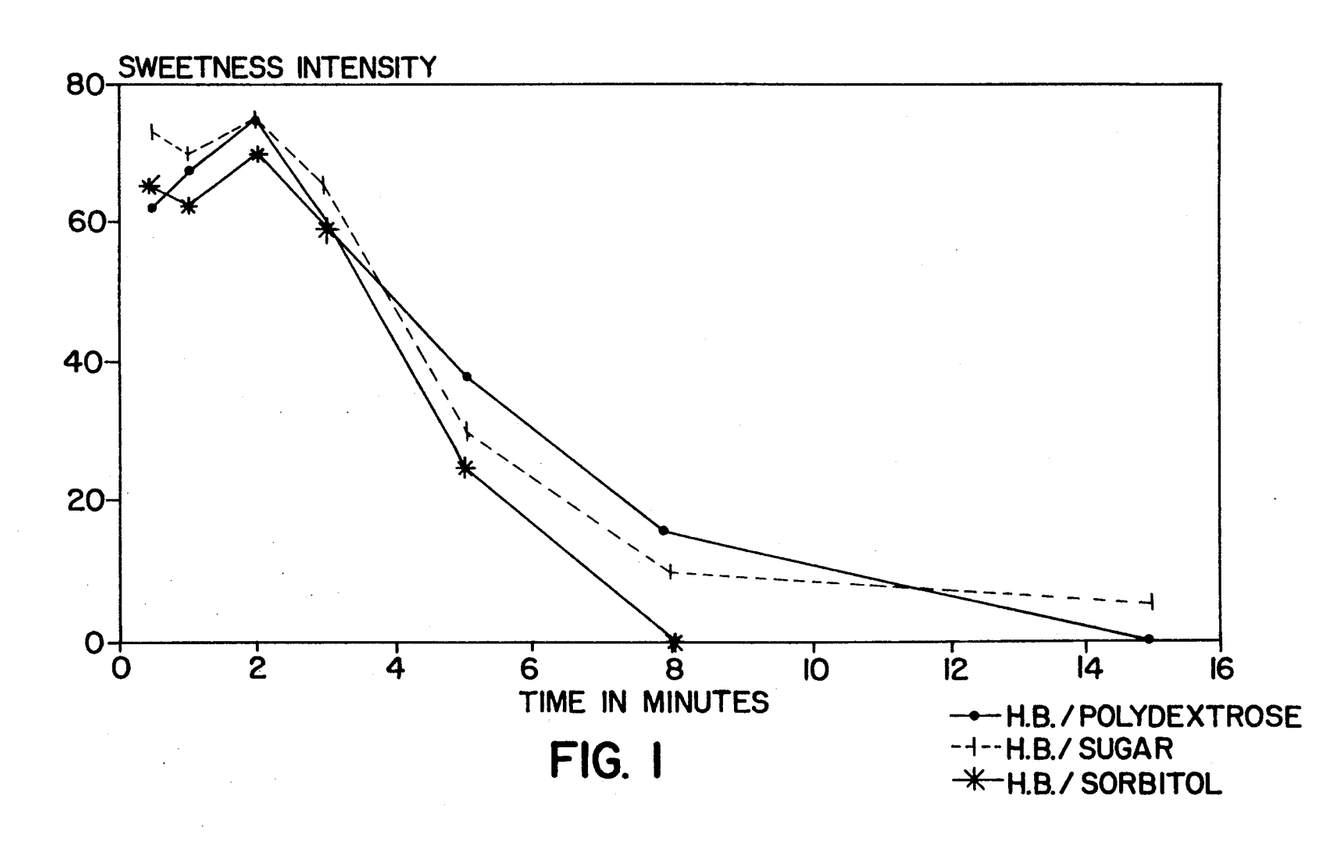
FIG. 1 depicts the sweetness intensity of sucralose released from anhydrous, reduced-calorie chewing gums containing 1500 ppm sucralose and various bulking agents.

Chewing gum pieces were made using the inventive formulations set forth in Table I, and the preferred process described above. The freshly made gum pieces were then subjected to a panel test for sweetness perception over time. The results are shown in FIG. 1. The sweetness intensity values recited therein are based on a mean score of 0 to 100, with 100 being the highest rating for sweetness perception. The reduced calorie chewing gum formulations of the invention were judged to be capable of immediately releasing sucralose at high intensities, such that sweetness intensities between about 60 and 80 were achieved within an initial 2 minutes of chewing. At about 5 minutes of chewing, the chewing gum formulations were judged to have sweetness intensities in the range of from about 20 to 60.

In addition, it is evident from FIG. 1 that a high intensity up-front release of sucralose was achieved with the formulations of this example, regardless of whether the bulking agent employed was polydextrose, sugar, or sorbitol.

TABLE I

| Ingredients | Inventive Run | | |
|---|---|---|---|
|  | I | II | III |
| Gum Base | 68 | 68 | 68 |
| Hygroscopic Liquid | 5 | 5 | 5 |
| Polydextrose | 18.15 | — | — |
| Sugar | — | 18.15 | — |
| Sorbitol | — | — | 18.15 |
| Fillers | 6 | 6 | 6 |
| Softener | 0.5 | 0.5 | 0.5 |
| Flavor (menthol/peppermint) | 2 | 2 | 2 |
| Color | 0.2 | 0.2 | 0.2 |
| Sucralose | 0.15 | 0.15 | 0.15 |
|  | 100.00 | 100.00 | 100.00 |

EXAMPLE 2

Table II shows various reduced calorie chewing gum formulations of the invention using a higher amount of sucralose as the sweetener of choice, with the same variations in bulking agent as employed in Example 1.

Chewing gum pieces were prepared using the inventive formulations set forth in Table II, and the preferred process described above. The freshly made gum pieces were then subjected to a panel test for sweetness perception over time. The results are set forth in FIG. 2. As illustrated therein, a high intensity up-front release of sucralose was achieved with the formulations of this example, irrespective of whether the bulking agent employed was polydextrose, sugar, or sorbitol.

Figure 2:
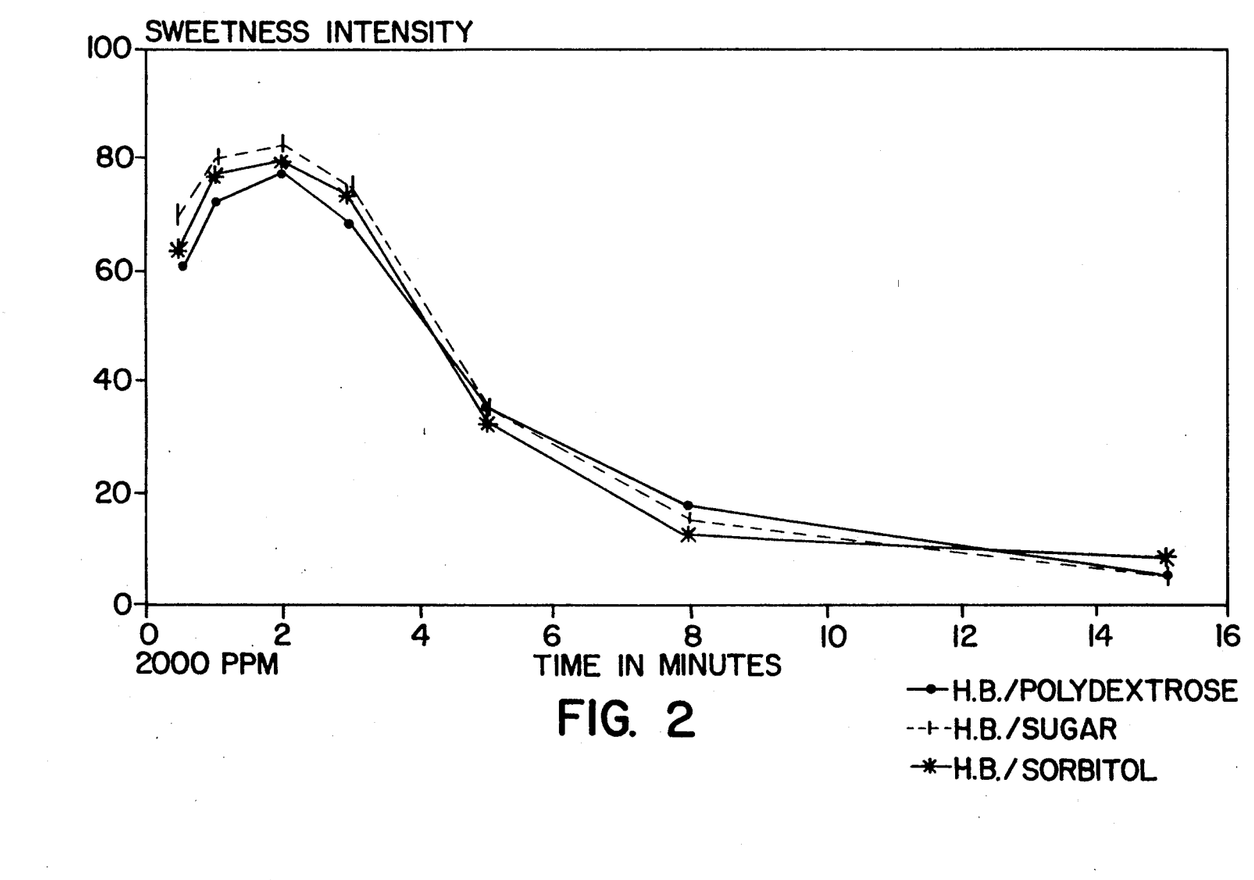
FIG. 2 depicts the sweetness intensity of sucralose released from anhydrous, reduced calorie chewing gums containing 2000 ppm sucralose and various bulking agents.

In addition, a comparison of FIG. 1 and FIG. 2 shows that as the sucralose level in the chewing gum formulation is increased, longer lasting sweetness perception is achieved.

TABLE II

| Ingredients | Inventive Run | | |
|---|---|---|---|
|  | IV | V | VI |
| Gum Base | 68 | 68 | 68 |
| Hygroscopic Liquid | 5 | 5 | 5 |
| Polydextrose | 18.1 | — | — |

TABLE II-continued

| Ingredients | Inventive Run | | |
|---|---|---|---|
| | IV | V | VI |
| Sugar | — | 18.1 | — |
| Sorbitol | — | — | 18.1 |
| Fillers | 6 | 6 | 6 |
| Softener | 0.5 | 0.5 | 0.5 |
| Flavor (menthol/peppermint) | 2 | 2 | 2 |
| Color | 0.2 | 0.2 | 0.2 |
| Sucralose | 0.2 | 0.2 | 0.2 |
| | 100.00 | 100.00 | 100.00 |

EXAMPLE 3

Table III shows various reduced calorie chewing gum formulations of the invention using sucralose as the sweetener of choice with varying amounts of gum base.

Figure 3:
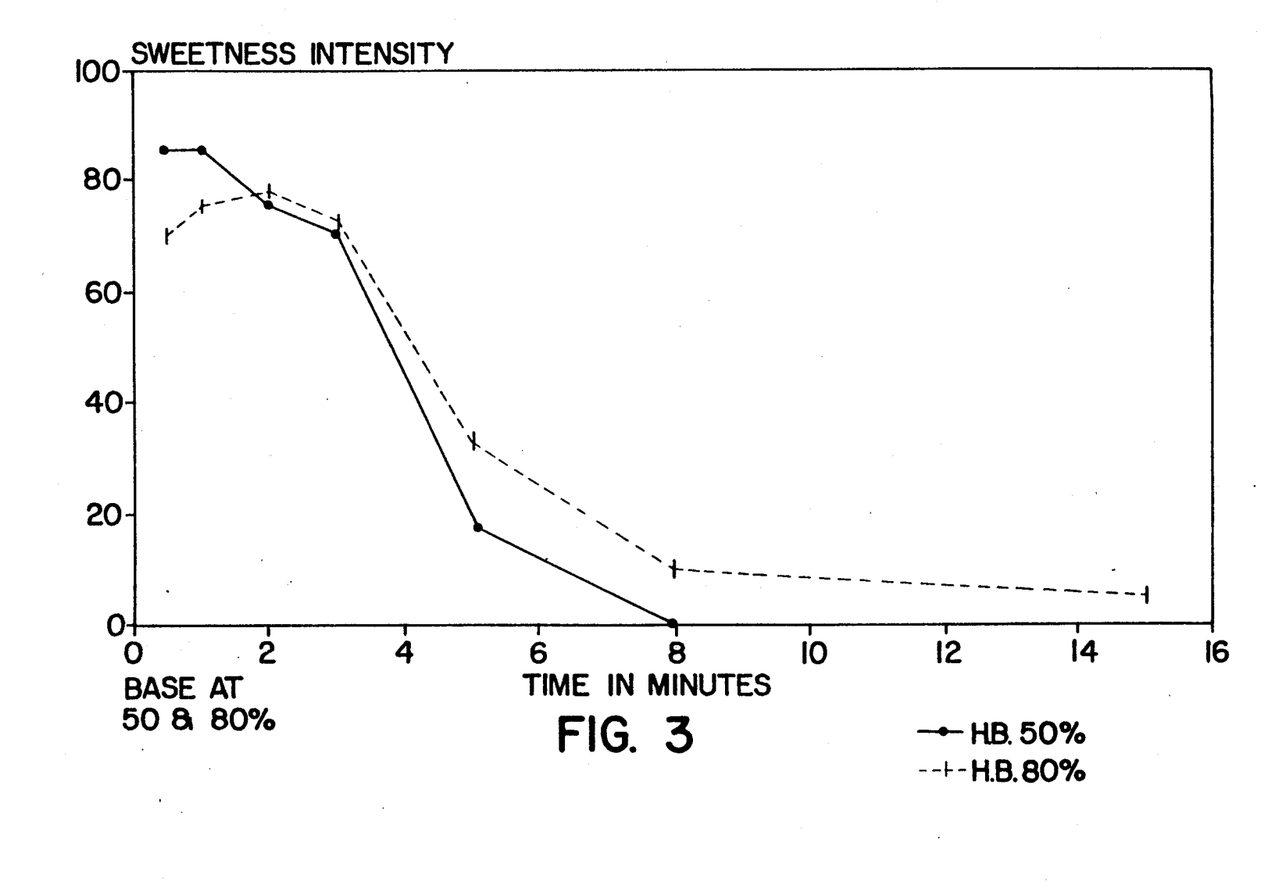
FIG. 3 depicts the sweetness intensity of sucralose released from anhydrous, reduced calorie chewing gums containing sucralose and various amounts of the same bulking agent.

Chewing gum pieces were prepared using the inventive formulations set forth in Table III, and the preferred process described above. Sugar was employed as the bulking agent in each of the inventive runs. The freshly made gum pieces were then subjected to a panel test for sweetness perception over time. The results are set forth in FIG. 3. As illustrated therein, a high intensity up-front release of sucralose was achieved with the formulations of this example irrespective of the amount of high base content gum utilized.

TABLE III

| Ingredients | Inventive Run | |
|---|---|---|
| | VII | VIII |
| Gum Base | 50 | 50 |
| Hygroscopic Liquid | 5 | 5 |
| Sugar | 36.1 | 36.1 |
| Fillers | 6 | 6 |
| Softener | 0.5 | 0.5 |
| Flavor (menthol/peppermint) | 2 | 2 |
| Color | 0.2 | 0.2 |
| Sucralose | 0.2 | 0.2 |
| | 100.00 | 100.00 |

The invention thus being described, it will be obvious that the same may be varied in many ways. Such variations are not to be regarded as a departure from the spirit and scope of the invention and all such modifications are intended to be included within the scope of the claims.

What is claimed is:

1. A reduced calorie sucralose sweetened chewing gum composition having a moisture content below about 2% by weight of the final composition, which comprises:
a major amount of chewing gum base, sucralose, at least a minor amount of one bulking agent selected from the group consisting of polydextrose, sugar, sugar alcohols and mixtures thereof and from about 3% to about 15% hygroscopic liquid by weight of the chewing gum composition, wherein said sucralose releases from said chewing gum composition so as to provide a high up-front sweetness intensity within the initial 2 minutes of chewing said chewing gum composition.

2. The reduced calorie chewing gum composition of claim 1, wherein the gum base is present in an amount of 65% to about 80% by weight of the final composition.

3. The reduced calorie chewing gum composition of claim 1, wherein said bulking agent is present in an amount of less than 50% by weight of the final composition.

4. The reduced calorie chewing gum composition of claim 1, wherein said sugar alcohol is selected from the group consisting of xylitol, mannitol, maltitol, sorbitol and mixtures thereof.

5. The reduced calorie chewing gum composition of claim 4, wherein said sugar alcohol is present in an amount of about 0% to 35% by weight of the chewing gum composition.

6. The reduced calorie chewing gum composition of claim 4, wherein said sugar alcohol is present in an amount of about 0% to about 15% by weight of the chewing gum composition.

7. The reduced calorie chewing gum composition of claim 1, wherein said hygroscopic liquid is glycerin or 1,2 propanediol.

8. The reduced calorie chewing gum composition of claim 7, wherein said hygroscopic liquid is present in an amount of about 4% to about 6% by weight of the chewing gum composition.

9. The reduced calorie chewing gum composition of claim 1, wherein said sucralose is present in an amount of about 0.05% to about 0.5% by weight of the chewing gum composition.

10. The reduced calorie chewing gum composition of claim 1, wherein said gum base is selected from the group consisting of natural or synthetic elastomers.

11. The reduced calorie chewing gum composition of claim 1, wherein said gum base comprises a non-SBR/PVA chewing gum base.

12. The reduced calorie chewing gum composition of claim 1, wherein an additional sweetener is added to the composition which is a natural or synthetic compound.

13. The reduced calorie chewing gum composition of claim 12, wherein said additional sweetener is selected from the group consisting of water-soluble sweetening agents, water-soluble artificial sweeteners, dipeptide based sweeteners and mixtures thereof.

14. The reduced calorie chewing gum composition of claim 1, containing one or more additional components selected from the group consisting of fillers, plasticizers, softeners, coloring agents, flavors and mixtures thereof.

15. A process for preparing a reduced calorie sucralose sweetened chewing gum composition having a moisture content below about 2% by weight of the final composition, which comprises:
softening a major amount of gum base and adding thereto a portion of the total amount to be added of at least a minor amount of one bulking agent selected from the group consisting of polydextrose, sugar, sugar alcohols and mixtures thereof, while mixing the ingredients; adding to this mixture from about 3% to about 15% by weight hygroscopic liquid while mixing the formulation followed by addition and mixing of a pre-blend containing sucralose admixed with the remaining amount of bulking agent; continuing mixing until a homogenous mixture is obtained; and recovering the composition, and wherein the sucralose is released from said composition so as to provide a high up-front sweetness intensity during the initial 2 minutes of chewing said chewing gum composition.

16. The process of claim 15, wherein said gum base is present in an amount of about 65% to about 80% by weight of the chewing gum composition.

17. The process of claim 15, wherein said bulking agent is present in an amount of less than 50% by weight of the final composition.

18. The process of claim 17, wherein said sugar alcohol is selected from the group consisting of xylitol, mannitol, maltitol, sorbitol and mixtures thereof.

19. The process of claim 18, wherein said sugar alcohol is present in an amount of about 0% to 35% by weight of the chewing gum composition.

20. The process of claim 19, wherein said sugar alcohol is present in an amount of about 0% to about 15% by weight of the chewing gum composition.

21. The process of claim 15, wherein said hygroscopic liquid is glycerin or 1,2 propanediol.

22. The process of claim 21, wherein said hygroscopic liquid is present in an amount of about 4% to about 6% by weight of the chewing gum composition.

23. The process of claim 15, wherein said sucralose is present in an amount of about 0.05% to about 0.5% by weight of the chewing gum composition.

24. The process of claim 15, wherein said gum base is selected from the group consisting of natural or synthetic elastomers.

25. The process of claim 15, wherein said gum base comprises a non-SBR/PVA chewing gum base.

26. The process of claim 15, wherein an additional sweetener is added to the composition which is a natural or synthetic compound.

27. The process of claim 26, wherein said additional sweetener is selected from the group consisting of watersoluble sweetening agents, water-soluble artificial sweeteners, dipeptide based sweeteners and mixtures thereof.

28. The process of claim 15, containing one or more additional components selected from the group consisting of fillers, plasticizers, softeners, coloring agents, flavors and mixtures thereof.

* * * * *